United States Patent
Kaku

(10) Patent No.: US 12,400,415 B2
(45) Date of Patent: Aug. 26, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/181,619

(22) Filed: Mar. 10, 2023

(65) Prior Publication Data

US 2023/0290097 A1    Sep. 14, 2023

(30) Foreign Application Priority Data

Mar. 14, 2022    (JP) ................................ 2022-039540

(51) Int. Cl.
   *G06T 19/20*    (2011.01)
   *G06V 10/74*    (2022.01)

(52) U.S. Cl.
   CPC ............ *G06T 19/20* (2013.01); *G06V 10/761* (2022.01); *G06T 2219/2004* (2013.01)

(58) Field of Classification Search
   CPC ............ G06T 19/20; G06T 2219/2004; G06V 10/761
   See application file for complete search history.

(56) References Cited

U.S. PATENT DOCUMENTS

| | | | |
|---|---|---|---|
| 11,765,332 B2 * | 9/2023 | Oz | G06T 19/006 348/14.08 |
| 2004/0240652 A1 | 12/2004 | Kanada | |
| 2012/0131478 A1 * | 5/2012 | Maor | G06T 19/20 715/757 |
| 2013/0083154 A1 * | 4/2013 | Kim | H04N 7/147 348/14.08 |
| 2018/0352193 A1 * | 12/2018 | Sakai | H04M 11/00 |
| 2019/0320143 A1 * | 10/2019 | Izumihara | H04N 7/144 |
| 2020/0195889 A1 * | 6/2020 | Sakai | H04N 7/147 |
| 2020/0342671 A1 * | 10/2020 | Ishihara | G06F 3/011 |
| 2021/0368135 A1 * | 11/2021 | McElroy | H04N 7/147 |
| 2022/0103784 A1 * | 3/2022 | Pollefeys | H04N 5/272 |
| 2022/0321372 A1 * | 10/2022 | Cho | H04L 12/1822 |
| 2023/0021861 A1 * | 1/2023 | Fujiwara | G02B 27/017 |
| 2023/0139626 A1 * | 5/2023 | Berliner | G06F 1/1694 345/156 |
| 2023/0224434 A1 * | 7/2023 | Choi | H04N 7/144 348/14.16 |
| 2024/0013503 A1 * | 1/2024 | Tsurumi | G06T 19/006 |

(Continued)

FOREIGN PATENT DOCUMENTS

| | | | |
|---|---|---|---|
| JP | 2004-282431 A | 10/2004 | |
| JP | 2004-348647 A | 12/2004 | |

(Continued)

*Primary Examiner* — Yu Chen
(74) *Attorney, Agent, or Firm* — Sughrue Mion, PLLC

(57) ABSTRACT

A controller of an information processing apparatus is configured to adjust a virtual distance from a predetermined reference position in virtual space to an object in the virtual space, the object corresponding to an interlocutor of a user, so that the sum of a real distance from a display disposed in real space to the user in the real space and the virtual distance corresponds to a predetermined value.

6 Claims, 3 Drawing Sheets

(56) References Cited

U.S. PATENT DOCUMENTS

| | | | | |
|---|---|---|---|---|
| 2024/0119682 A1* | 4/2024 | Rudman | ................ | G06V 20/20 |
| 2024/0144413 A1* | 5/2024 | Ishii | ................ | G06Q 50/01 |
| 2024/0331377 A1* | 10/2024 | Sugihara | ................ | G06V 20/20 |

FOREIGN PATENT DOCUMENTS

| | | |
|---|---|---|
| JP | 2012-085172 A | 4/2012 |
| WO | 2018/193687 A1 | 10/2018 |

* cited by examiner

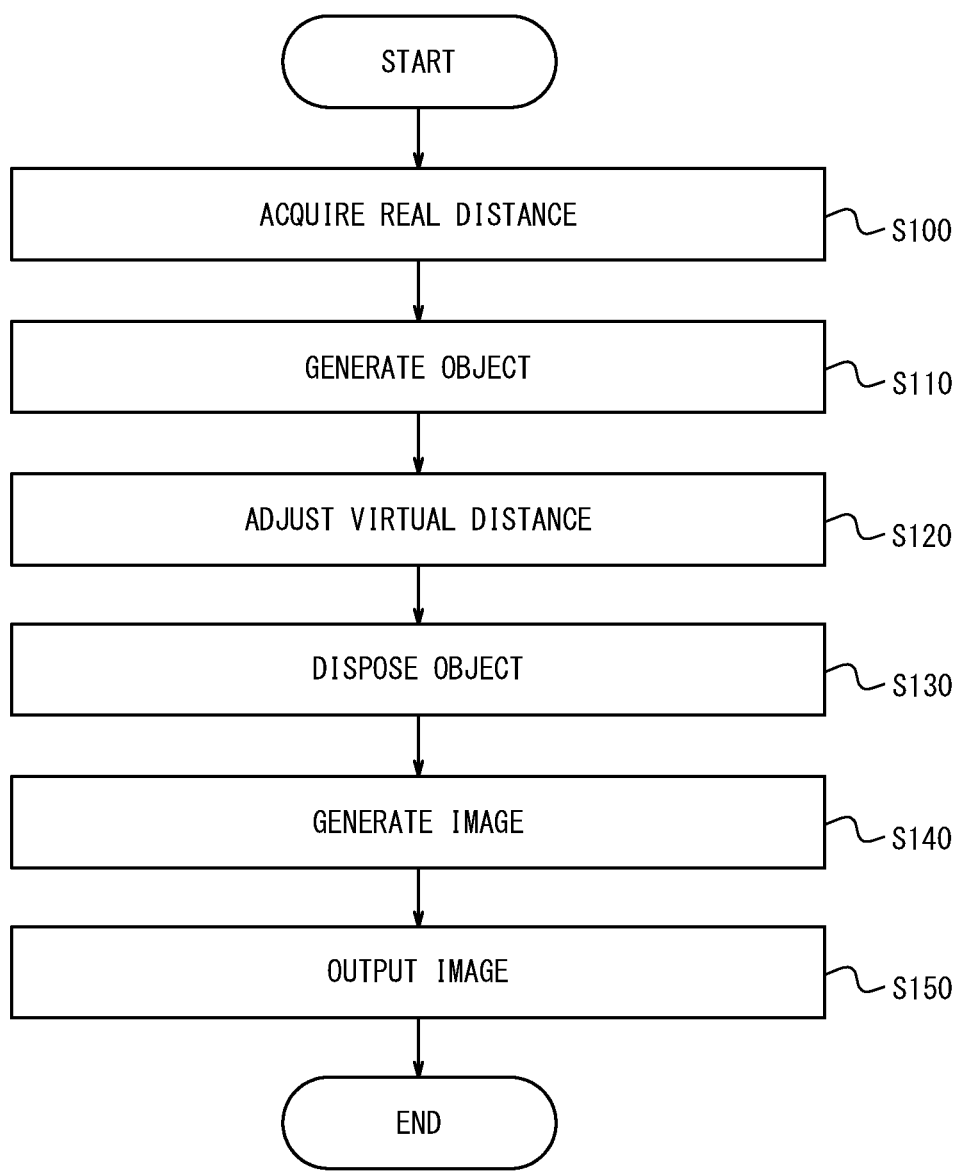

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-039540 filed on Mar. 14, 2022, the entire contents of which are incorporated herein by reference.

TECHNICAL FIELD

The present disclosure relates to an information processing apparatus, a method, and a program.

BACKGROUND

Technology for video conferencing using communication lines is known. For example, Patent Literature (PTL) 1 discloses technology in which a user distance L1 between a user and a TV intercommunication apparatus is transmitted to the other TV intercommunication apparatus, and a distance information control means commands a display image conversion means to convert an image so that a virtual image of the user is generated at a position where a user distance L2 on the other TV intercommunication apparatus and the user distance L1 are added.

CITATION LIST

Patent Literature

PTL 1: JP 2004-282431 A

SUMMARY

There is room for improvement with respect to technology for reducing fatigue in video conferencing.

It would be helpful to improve technology for reducing fatigue in video conferencing.

An information processing apparatus according to an embodiment of the present disclosure includes a controller configured to adjust a virtual distance from a predetermined reference position in virtual space to an object in the virtual space, the object corresponding to an interlocutor of a user, so that the sum of a real distance from a display disposed in real space to the user in the real space and the virtual distance corresponds to a predetermined value.

A method according to an embodiment of the present disclosure is a method performed by an information processing apparatus, the method including adjusting a virtual distance from a predetermined reference position in virtual space to an object in the virtual space, the object corresponding to an interlocutor of a user, so that the sum of a real distance from a display disposed in real space to the user in the real space and the virtual distance corresponds to a predetermined value.

A program according to an embodiment of the present disclosure is configured to cause a computer to execute an operation, the operation including adjusting a virtual distance from a predetermined reference position in virtual space to an object in the virtual space, the object corresponding to an interlocutor of a user, so that the sum of a real distance from a display disposed in real space to the user in the real space and the virtual distance corresponds to a predetermined value.

According to an embodiment of the present disclosure, technology for reducing fatigue in video conferencing can be improved.

BRIEF DESCRIPTION OF THE DRAWINGS

In the accompanying drawings:

FIG. 3 is a flowchart illustrating operations of the information processing apparatus according to the embodiment of the present disclosure.

DETAILED DESCRIPTION

Hereinafter, an embodiment of the present disclosure will be described.

Figure 1:
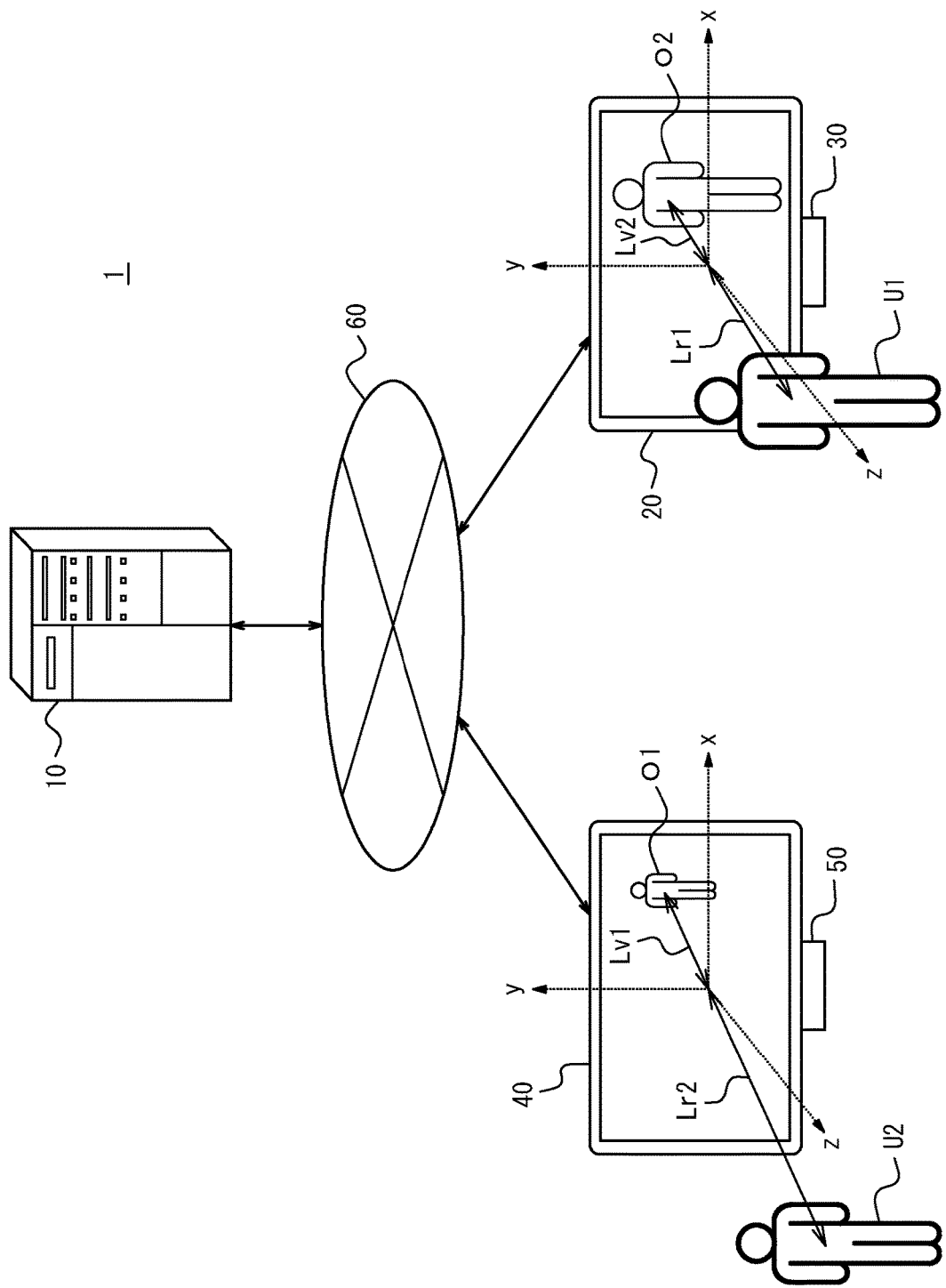
FIG. 1 is a block diagram illustrating a schematic configuration of a system according to an embodiment of the present disclosure.

An outline of a system 1 according to the embodiment of the present disclosure will be described with reference to FIG. 1.

The system 1 has an information processing apparatus 10, a first display 20, a first camera 30, a second display 40, and a second camera 50. The information processing apparatus 10, the first display 20, and the second display 40 are communicably connected to a network 60.

The information processing apparatus 10 is a computer such as a server that belongs to a cloud computing system or another type of computing system.

The first display 20 and the second display 40 are each, for example, a light field display that employs a light field system capable of reproducing light rays emitted by any object, but are not limited to this. The first display 20 and the second display 40 may each be a conventional display, such as a liquid crystal display (LCD) or an organic electro luminescence (EL) display.

The first camera 30 and the second camera 50 are each an RGB-D camera that can capture range images, in addition to color images, for example, but are not limited to this. In the present embodiment, the first camera 30 is provided at the center of a lower side of a screen of the first display 20, but is not limited to this. In the present embodiment, the second camera 50 is provided at the center of a lower side of a screen of the second display 40, but is not limited to this.

The network 60 includes the Internet, at least one wide area network (WAN), at least one metropolitan area network (MAN), or any combination thereof. The network 60 may include at least one wireless network, at least one optical network, or any combination thereof. The wireless network is, for example, an ad hoc network, a cellular network, a wireless local area network (LAN), a satellite communication network, or a terrestrial microwave network.

An outline of the present embodiment will be described with reference to FIG. 1.

A controller 11 of the information processing apparatus 10 is configured to adjust a second virtual distance $Lv2$ from a predetermined reference position in second virtual space to a second object $O2$, in the second virtual space, corresponding to an interlocutor of a first user $U1$, so that the sum of a first real distance $Lr1$ from the first display 20 disposed in first real space to the first user $U1$ in the first real space and the second virtual distance $Lv2$ is a predetermined value. Similarly, the controller 11 of the information processing apparatus 10 is configured to adjust a first virtual distance Lv1 from a predetermined reference position in first virtual space to a first object O1, in the first virtual space, corresponding to an interlocutor of a second user U2, so that the sum of a second real distance Lr2 from the second display 40 disposed in second real space to the second user U2 in the second real space and the first virtual distance Lv1 is a predetermined value.

Thus, according to the present embodiment, for example, in a case in which the first user U1, whose personal space encompasses a distance of 1 m, and the second user U2, whose personal space encompasses a distance of 2 m, have a video conference, the second object O2 is displayed on the side of the first user U1 as if the second object O2 is 1 m away. On the other hand, the first object O1 is displayed on the side of the second user U2 as if the first object O1 is 2 m away. Thus, the personal space for the first user U1 and the personal space for the second user U2 are both protected. Therefore, technology for reducing fatigue in video conferencing can be improved.

Figure 2:
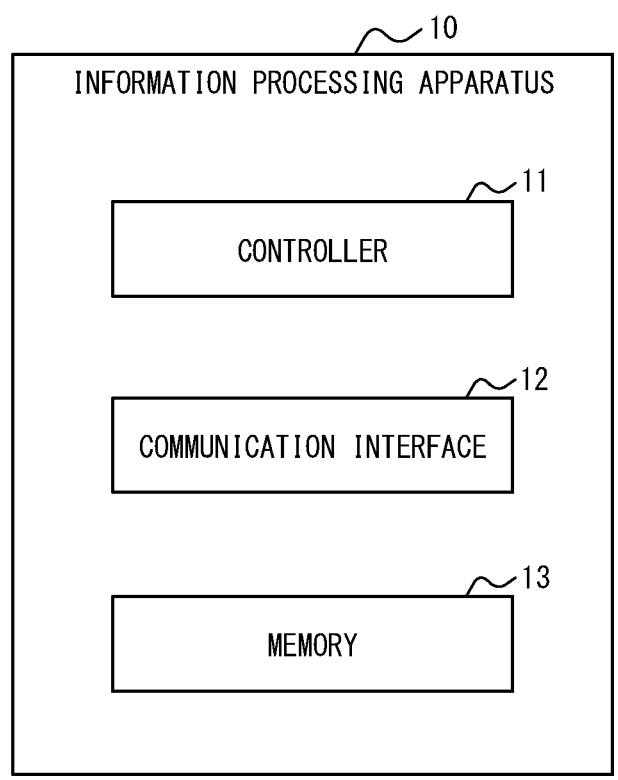
FIG. 2 is a block diagram illustrating a schematic configuration of an information processing apparatus according to the embodiment of the present disclosure.

A configuration of the information processing apparatus 10 according to the present embodiment will be described with reference to FIG. 2.

The information processing apparatus 10 includes the controller 11, a communication interface 12, and a memory 13.

The controller 11 includes at least one processor, at least one programmable circuit, at least one dedicated circuit, or any combination thereof. The processor is a general purpose processor such as a central processing unit (CPU) or a graphics processing unit (GPU), or a dedicated processor that is dedicated to specific processing. The programmable circuit is, for example, a field-programmable gate array (FPGA). The dedicated circuit is, for example, an application specific integrated circuit (ASIC). The controller 11 executes processes related to operations of the information processing apparatus 10 while controlling the components of the information processing apparatus 10. In the present embodiment, the controller 11 controls operations of a first virtual camera that can capture subject images of any object disposed in first virtual space. Similarly, the controller 11 controls operations of a second virtual camera that can capture subject images of any object disposed in second virtual space.

The communication interface 12 includes at least one interface for communication. The interface for communication is compliant with, for example, a mobile communication standard, a wired LAN standard, or a wireless LAN standard, but not limited to these, and may be compliant with any communication standard. The communication interface 12 receives data to be used for the operations of the information processing apparatus 10. The communication interface 12 transmits data obtained by the operations of the information processing apparatus 10.

The memory 13 includes at least one semiconductor memory, at least one magnetic memory, at least one optical memory, or any combination thereof. The semiconductor memory is, for example, random access memory (RAM) or read only memory (ROM). The RAM is, for example, static random access memory (SRAM) or dynamic random access memory (DRAM). The ROM is, for example, electrically erasable programmable read only memory (EEPROM). The memory 13 functions as, for example, a main memory, an auxiliary memory, or a cache memory. The memory 13 stores data to be used for the operations of the information processing apparatus 10 and data obtained by the operations of the information processing apparatus 10. In the present embodiment, the data to be used for the operations of the information processing apparatus 10 includes a system program, an application program, a database, texture images, and the like.

The operations of the information processing apparatus 10 according to the present embodiment will be described with reference to FIG. 3. These operations correspond to a method according to an embodiment of the present disclosure.

In this example, assuming that a first user U1 in first real space and a second user U2 in second real space are video conferencing via the network 60. Thus, the first user U1 corresponds to an interlocutor of the second user U2. The second user U2 corresponds to an interlocutor of the first user U1. A coordinate system of the first real space has an origin at the center of the screen of the first display 20, an x-axis in the right direction of the screen, a y-axis in the upper direction of the screen, and a z-axis in the front direction of the screen. A coordinate system of the second real space has an origin at the center of the screen of the second display 40, an x-axis in the right direction of the screen, a y-axis in the upper direction of the screen, and a z-axis in the front direction of the screen. However, the present disclosure is not limited to these.

Step S100: The controller 11 of the information processing apparatus 10 acquires a first real distance Lr1 from the first display 20 disposed in the first real space to the first user U1 in the first real space. Similarly, the controller 11 acquires a second real distance Lr2 from the second display 40 disposed in the second real space to the second user U2 in the second real space.

Specifically, the controller 11 of the information processing apparatus 10 identifies, for example, a center position (x1, y1, z1) of a head of the user U1 using the first camera 30. The controller 11 then sets the length of a vector (x1, 0, z1) as the first real distance Lr1, for example. Similarly, the controller 11 identifies, for example, a center position (x2, y2, z2) of a head of the second user U2 using the second camera 50. The controller 11 then sets the length of a vector (x2, 0, z2) as the second real distance Lr2, for example.

Step S110: The controller 11 of the information processing apparatus 10 generates a second object O2 corresponding to the second user U2. Similarly, the controller 11 generates a first object O1 corresponding to the first user U1.

Specifically, the controller 11 of the information processing apparatus 10 generates the second object O2, which is constituted of polygons on which a texture image is projected by texture mapping technology, for example, based on an image of the second user U2 acquired by the second camera 50. Similarly, the controller 11 generates the first object O1, which is constituted of polygons on which a texture image is projected by texture mapping technology, for example, based on an image of the first user U1 acquired by the first camera 30.

Step S120: The controller 11 of the information processing apparatus 10 adjusts a second virtual distance Lv2 from a predetermined reference position in second virtual space to the second object O2 generated in step S110, so that the sum of the first real distance Lr1 acquired in step S100 and the second virtual distance Lv2 is a predetermined value. Similarly, the controller 11 adjusts a first virtual distance Lv1 from a predetermined reference position in first virtual space to the first object O1 generated in step S110, so that the sum of the second real distance Lr2 acquired in step S100 and the first virtual distance Lv1 is a predetermined value.

Specifically, the controller 11 of the information processing apparatus 10 calculates the predetermined value based on, for example, a distance to be allocated by the first user U1 between the first user U1 and the second user U2, stored in advance in the memory 13. The controller 11 then adjusts the second virtual distance Lv2 so that the sum of the first real distance Lr1 and the second virtual distance Lv2 is the calculated predetermined value. Similarly, the controller 11 calculates the predetermined value based on a distance to be allocated by the second user U2 between the second user U2 and the first user U1. The controller 11 then adjusts the first virtual distance Lv1 so that the sum of the second real distance Lr2 and the first virtual distance Lv1 is the calculated predetermined value. The distance may be an interpersonal distance (personal space) that can be estimated by monitoring each of the first and second users U1 and U2 using any method, and the predetermined value may be equal to the interpersonal distance.

Additionally or alternatively, the controller 11 may calculate the predetermined value, for example, based on the amount of speech by the first user U1 to the second user U2, stored in advance in the memory 13. For example, the more the amount of speech, the smaller the predetermined value may be set, and the less the amount of speech, the larger the predetermined value may be set. The controller 11 may then adjust the second virtual distance Lv2 so that the sum of the first real distance Lr1 and the second virtual distance Lv2 is the calculated predetermined value. Similarly, the controller 11 may calculate the predetermined value based on the amount of speech by the second user U2 to the first user U1. The controller 11 may then adjust the first virtual distance Lv1 so that the sum of the second real distance Lr2 and the first virtual distance Lv1 is the calculated predetermined value. The amount of speech may be the amount of speech that can be analyzed by monitoring, using any method, the video conference in which the first and second users U1 and U2 participate.

Additionally or alternatively, the controller 11 may calculate a score indicating closeness of the first user U1 to the second user U2, based on the distance or amount of speech described above. The controller 11 may then set the predetermined value smaller the higher the score indicating the closeness of the first user U1 to the second user U2, and may set the predetermined value larger the lower the score indicating the closeness of the first user U1 to the second user U2. Similarly, the controller 11 may calculate a score indicating closeness of the second user U2 to the first user U1, based on the distance or amount of speech described above. The controller 11 may then set the predetermined value smaller the higher the score indicating the closeness of the second user U2 to the first user U1, and may set the predetermined value larger the lower the score indicating the closeness of the second user U2 to the first user U1. The score indicating the closeness may be a stepwise index such as "high, medium, low" or a continuous index scaling from 0% to 100%.

Step S130: The controller 11 of the information processing apparatus 10 disposes the second object O2 generated in step S110 in the second virtual space at a position distant from the predetermined reference position by the second virtual distance Lv2 adjusted in step S120. Similarly, the controller 11 disposes the first object O1 generated in step S110 in the first virtual space at a position distant from the predetermined reference position by the first virtual distance Lv1 adjusted in step S120.

Here, the predetermined reference position may be, for the second object O2, a three-dimensional coordinate position, in the second virtual space, corresponding to the center position (0, 0, 0) of the screen of the first display 20, and, for the first object O1, a three-dimensional coordinate position, in the first virtual space, corresponding to the center position (0, 0, 0) of the screen of the second display 40. The coordinate system of the first real space is mapped to a coordinate system of the second virtual space by a coordinate transformation predetermined by any method. The coordinate system of the second real space is mapped to a coordinate system of the first virtual space by a coordinate transformation predetermined by any method.

Step S140: The controller 11 of the information processing apparatus 10 generates an image including a subject image of the second object O2 disposed in step S130 by a second virtual camera disposed in the second virtual space. The controller 11 generates an image including a subject image of the first object O1 disposed in step S130 by a first virtual camera disposed in the first virtual space.

Specifically, the controller 11 of the information processing apparatus 10 disposes the second virtual camera in the second virtual space at a three-dimensional coordinate position (X1, Y1, Z1) corresponding to, for example, the center position (x1, y1, z1) of the head of the first user U1 identified in step S100. The controller 11 then generates (renders) the image including the subject image of the second object O2 that is present within a field of view (imaging range) of the second virtual camera. Similarly, the controller 11 disposes the first virtual camera in the first virtual space at a three-dimensional coordinate position (X2, Y2, Z2) corresponding to, for example, the center position (x2, y2, z2) of the head of the second user U2 identified in step S100. The controller 11 then generates (renders) the image including the subject image of the first object O1 that is present within a field of view (imaging range) of the first virtual camera.

Step S150: The controller 11 of the information processing apparatus 10 outputs the image, which includes the subject image of the second object O2, generated in step S140 to the first display 20 disposed in the first real space. The controller 11 also outputs the image, which includes the subject image of the first object O1, generated in step S140 to the second display 40 disposed in the second real space.

Specifically, the controller 11 of the information processing apparatus 10 controls the communication interface 12 to output the image, which includes the subject image of the second object O2, generated in step S140 to the first display 20 disposed in the first real space. The controller 11 also controls the communication interface 12 to output the image, which includes the subject image of the first object O1, generated in step S140 to the second display 40 disposed in the second real space. A transmission method of the images from the information processing apparatus 10 to each of the first and second displays 20 and 40 may be a serial transmission method using HDMI (HDMI is a registered trademark in Japan, other countries, or both).

As described above, the controller 11 of the information processing apparatus 10 is configured to adjust the second virtual distance Lv2 from the predetermined reference position in the second virtual space to the second object O2, in the second virtual space, corresponding to the interlocutor of the first user U1, so that the sum of the first real distance Lr1 from the first display 20 disposed in the first real space to the first user U1 in the first real space and the second virtual distance Lv2 is the predetermined value. Similarly, the controller 11 of the information processing apparatus 10 is configured to adjust the first virtual distance Lv1 from the predetermined reference position in the first virtual space to the first object O1, in the first virtual space, corresponding to the interlocutor of the second user U2, so that the sum of the second real distance Lr2 from the second display disposed in the second real space to the second user U2 in the second real space and the first virtual distance Lv1 is the predetermined value.

According to such a configuration, for example, in a case in which the first user U1, whose personal space is 1 m, and the second user U2, whose personal space is 2 m, have a video conference, the second object O2 is displayed on the side of the first user U1 as if the second object O2 is 1 m away. On the other hand, the first object O1 is displayed on the side of the second user U2 as if the first object O1 is 2 m away. Thus, the personal space for the first user U1 and the personal space for the second user U2 are both protected. Therefore, technology for reducing fatigue in video conferencing can be improved.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

As a variation, an embodiment in which the configuration and operations of the information processing apparatus 10 are distributed to multiple computers capable of communicating with each other can be implemented. For example, of processing in the above embodiment, processing on the side of the first user U1 and processing on the side of the second user U2 may be distributed and executed by two computers that can communicate with each other.

As another variation, the controller 11 of the information processing apparatus 10 may perform control to prevent the interlocutor from recognizing that the virtual distance has been adjusted. Specifically, in step S150, the controller 11 may not notify the first user U1 that the distance (=Lr2+Lv1) between the second user U2 and the first object O1 as recognized by the second user U2 is different from the distance (=Lr1+Lv2) between the first user U1 and the second object O2 as recognized by the first user U1. Similarly, in step S150, the controller 11 may not notify the second user U2 that the distance (=Lr1+Lv2) between the first user U1 and the second object O2 as recognized by the first user U1 is different from the distance (=Lr2+Lv1) between the second user U2 and the first object O1 as recognized by the second user U2.

As yet another variation, the controller 11 of the information processing apparatus 10 may adjust the layout of the image to be displayed on each of the first and second displays 20 and 40, based on the score indicating the closeness in the embodiment described above. For example, the lower the score indicating the closeness of the first user U1 to the second user U2, the closer a window for displaying the image including the subject image of the second object O2 may be disposed to an end of the screen of the first display 20. Similarly, the lower the score indicating the closeness of the second user U2 to the first user U1, the closer a window for displaying the image including the subject image of the first object O1 may be disposed to an end of the screen of the second display 40.

As yet another variation, the controller 11 of the information processing apparatus 10 may adjust the virtual distance for any one of the first and second users U1 and U2 in the same manner as in step S120 above, and may not adjust the virtual distance for the other user.

As yet another variation, an embodiment in which a general purpose computer functions as the information processing apparatus 10 according to the above embodiment can also be implemented. Specifically, a program in which processes for realizing the functions of the information processing apparatus 10 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An information processing apparatus comprising:
 a controller configured to adjust a virtual distance of an object in virtual space from a first distance to a second distance,
 wherein the first distance corresponds to a virtual distance between a second display in the virtual space and the object in the virtual space,
 wherein the second distance corresponds to a real distance between a first display disposed in real space and a user in the real space,
 wherein the object corresponds to an interlocutor of the user,
 wherein a sum of the first distance and the second distance corresponds to a predetermined interpersonal distance.

2. The information processing apparatus according to claim 1, wherein the controller is configured to calculate the interpersonal distance based on a distance allocated by the user between the user and the interlocutor.

3. The information processing apparatus according to claim 1, wherein the controller is configured to calculate the interpersonal distance based on an amount of speech by the user to the interlocutor.

4. The information processing apparatus according to claim 1, wherein the controller is configured to perform control to prevent the interlocutor from realizing that the virtual distance has been adjusted.

5. A method performed by an information processing apparatus, the method comprising:
 adjusting a virtual distance of an object in virtual space from a first distance to a second distance,
 wherein the first distance corresponds to a virtual distance between a second display in the virtual space and the object in the virtual space,
 wherein the second distance corresponds to a real distance between a first display disposed in real space and a user in the real space,
 wherein the object corresponds to an interlocutor of a user, and
 wherein a sum of the first distance and the second distance corresponds to a predetermined interpersonal distance.

6. A non-transitory computer readable medium storing a program configured to cause a computer to execute an operation, the operation comprising:
 adjusting a virtual distance of an object in virtual space from a first distance to a second distance,
 wherein the first distance corresponds to a virtual distance between a second display in the virtual space and the object in the virtual space,
 wherein the second distance corresponds to a real distance between a first display disposed in real space and a user in the real space,
 wherein the object corresponds to an interlocutor of a user, and wherein a sum of the first distance and the second distance corresponds to a predetermined interpersonal distance.

* * * * *